(12) United States Patent
Shen et al.

(10) Patent No.: US 12,446,490 B2
(45) Date of Patent: Oct. 21, 2025

(54) CROP ROW DETECTION DEVICE

(71) Applicant: Shandong Academy of Agricultural Machinery Sciences, Shandong (CN)

(72) Inventors: Jingxin Shen, Shandong (CN); Yongjia Sun, Shandong (CN); Yitian Sun, Shandong (CN); Qinglong Li, Shandong (CN); Gang Chen, Shandong (CN); Zhiqi Zhang, Shandong (CN)

(73) Assignee: Shandong Academy of Agricultural Machinery Sciences, Ji'an (CN)

( * ) Notice: Subject to any disclaimer, the term of this patent is extended or adjusted under 35 U.S.C. 154(b) by 0 days.

(21) Appl. No.: 18/940,811

(22) Filed: Nov. 7, 2024

(65) Prior Publication Data

US 2025/0248333 A1  Aug. 7, 2025

(30) Foreign Application Priority Data

Feb. 7, 2024 (CN) .......................... 202410171685.X

(51) Int. Cl.
*A01D 41/127* (2006.01)
*G01S 19/42* (2010.01)
(Continued)

(52) U.S. Cl.
CPC ............ *A01D 41/127* (2013.01); *G01S 19/42* (2013.01); *A01B 69/008* (2013.01); *A01D 45/021* (2013.01)

(58) Field of Classification Search
CPC .. A01D 41/127; A01D 45/021; A01B 69/008; G01S 19/42
See application file for complete search history.

(56) References Cited

U.S. PATENT DOCUMENTS 457,760 A * 8/1891 Cordrey ............. A01D 34/8355
56/100
2,817,941 A * 12/1957 Clapsaddle, Jr. ...... A01D 65/08
56/119
(Continued)

FOREIGN PATENT DOCUMENTS

CN  203015455 U  6/2013
CN  106647748 A  5/2017
(Continued)

OTHER PUBLICATIONS

First Notice of Examination Opinions Dated Aug. 20, 2024 for Corresponding Chinese Application No. CN202410171685.X along its Engligh Translation.

*Primary Examiner* — Arpad Fabian-Kovacs

(57) ABSTRACT

A crop row detection device and a navigation method fusing satellite positioning, including a bracket, a buffer mechanism and a angle sensing mechanism; both a left side and a right side of a front end of the bracket are rotatably connected with a support bar respectively; and the other end of each support bar is hingedly connected with linkage bars and collision plates; the buffer mechanism is arranged on the bracket; and the other ends of two linkage bars are rotatably connected onto the buffer mechanism respectively; angle sensing mechanism is arranged onto a rear end of the bracket; and other ends of two collision plates are rotatably connected onto the angle sensing mechanism; and upon the collision plates colliding crop rows and deflecting, the angle sensing mechanism is capable of triggering an action of an angle sensor.

5 Claims, 5 Drawing Sheets

(51) Int. Cl.
*A01B 69/04* (2006.01)
*A01D 45/02* (2006.01)

(56) References Cited

U.S. PATENT DOCUMENTS

| | | | | |
|---|---|---|---|---|
| 2,999,349 | A * | 9/1961 | Nichols, Jr. | A01D 46/08 56/28 |
| 3,680,648 | A * | 8/1972 | Tonsfeldt | A01B 39/00 172/671 |
| 3,812,661 | A * | 5/1974 | Baker | A01D 41/147 56/14.4 |
| 3,991,618 | A * | 11/1976 | Stampfer | B62D 1/28 33/DIG. 13 |
| 4,166,349 | A * | 9/1979 | Coenenberg | A01D 41/1278 56/DIG. 15 |
| 4,219,992 | A * | 9/1980 | Henry, Sr. | A01D 75/02 56/119 |
| RE31,063 | E * | 10/1982 | Greiner | A01D 45/021 56/119 |
| 4,538,404 | A * | 9/1985 | Heimark, Jr. | A01D 45/021 56/119 |
| 4,663,918 | A * | 5/1987 | Williams | A01B 69/008 56/DIG. 15 |
| 7,054,731 | B1 * | 5/2006 | Lange | A01B 69/008 701/50 |
| 7,073,316 | B2 * | 7/2006 | Resing | A01D 63/02 56/119 |
| 7,716,905 | B2 * | 5/2010 | Wilcox | A01D 41/1278 56/10.2 E |
| 9,565,802 | B2 * | 2/2017 | Schleicher | G01D 5/142 |
| 9,936,637 | B2 * | 4/2018 | Anderson | A01D 41/1271 |
| 10,674,652 | B2 * | 6/2020 | Ricketts | A01B 63/023 |
| 12,052,951 | B2 * | 8/2024 | Ricketts | A01D 57/01 |
| 12,189,392 | B2 * | 1/2025 | Li | B62D 15/029 |
| 2002/0035826 | A1 | 3/2002 | Albinger | A01D 41/144 56/109 |
| 2003/0226342 | A1 * | 12/2003 | Boeckmann | A01D 41/144 56/14.7 |
| 2007/0294906 | A1 * | 12/2007 | Reichhardt | G01B 7/14 33/832 |
| 2021/0286087 | A1 | 9/2021 | Yoshida et al. | |
| 2022/0225569 | A1 | 7/2022 | Zielke et al. | |

FOREIGN PATENT DOCUMENTS

| | | | |
|---|---|---|---|
| CN | 220274306 U | 1/2024 | |
| EP | 0136546 A1 * | 4/1985 | A01B 69/008 |
| EP | 0136547 A1 * | 4/1985 | A01B 69/008 |
| EP | 0136548 A1 * | 4/1985 | A01B 69/008 |
| FR | 2461440 A1 | 2/1981 | |
| KR | 20010017740 A | 3/2001 | |

\* cited by examiner

CROP ROW DETECTION DEVICE

TECHNICAL FIELD

The present disclosure relates to a technical field of agricultural equipment, and in particular, to a crop row detection device and a navigation method fusing satellite positioning.

BACKGROUND

At present, twin rows operations are an important way to improve the quality of harvesting and plant protection equipment for crops such as corn and cotton. However, existing plant protection and harvesting equipment mainly rely on manual operation for twin rows operations, which has high labor intensity and low intelligence. This problem has seriously restricted the comprehensive automation and intelligent development of operating equipment for corn, cotton and others in our country.

The prior art has at least the following shortcomings: Existing mechanical twin rows devices mostly use multiple sensors to detect one row of crops; and obtain the plant position of the crop rows by processing and comparing data from multiple sensors. When only acquiring the plant position of one row, problems such as loss of plant location information caused by problems of crop rows such as missing seedlings and broken rows, lead to problems such as complex data processing and low reliability; At the same time, the twin rows sensor lacks a collision force adjustment device during operation, which leads to problems such as damage to the crop and the collision sensing device, and large differences in data collected by the sensor during the collision process; When using the sowing operation trajectories as guidance for harvesters and plant protection machines, there are the following problems: during the sowing process, there are phenomena such as seed jumping, which results in a large gap between the plant position of the seedlings and the recorded sowing operation trajectory, and results in problems such as wrong rows and missed harvests caused by directly using the sowing trajectory.

SUMMARY

In order to solve the problems of complex twin rows (double rows) data processing in existing twin rows devices and the inability of single row to solve the problem of missing plant signals when missing sows are broken, the present disclosure provides a crop row detection device and a navigation method fusing satellite positioning.

The present disclosure is achieved according to the following technical solutions:
  a crop row detection device, including a bracket, a buffer mechanism and an angle sensing mechanism;
  both a left side and a right side of a front end of the bracket are rotatably connected with a support bar respectively; and the other end of each support bar is hingedly connected with linkage bars and collision plates;
  the buffer mechanism is arranged on the bracket; and the other ends of two linkage bars are rotatably connected onto the buffer mechanism respectively;
  The angle sensing mechanism is arranged onto a rear end of the bracket; and other ends of two collision plates are rotatably connected onto the angle sensing mechanism; and upon the collision plates colliding crop rows and deflecting, the angle sensing mechanism is capable of triggering an action of an angle sensor.

Furthermore, the buffer mechanism includes a sliding base and a sliding sleeve; and the sliding sleeve is slidingly connected to an outside of the sliding base; and a compression spring is arranged at an outer wall of the sliding base; and one end of the compression spring is connected with the sliding base, the other end of the compression spring is connected with the sliding sleeve;
  the other ends of the two linkage bars are rotatably connected with both the left side and the right side of the sliding sleeve respectively.

Furthermore, the buffer mechanism further includes a screw, a motor and a linear bearing; a motor fixing plate is arranged on the bracket; and a support fixing plate is at a front end of the bracket; and front ends of two support bars are symmetrically hinged onto both the left side and the right side of the support fixing plate; and one end of the screw is spirally mounted on a front end of the bracket; the motor is mounted onto the motor fixing plate; and the output shaft of the motor is connected to the other end of the screw;
  the linear bearing is threadedly connected onto the screw; and the sliding base is slidingly connected onto the screw; and a base flange is arranged at a rear end of the sliding base; and the base flange is connected with the linear bearing.

Furthermore, a sensor fixing plate is arranged at a rear end of the bracket; and the angle sensor is mounted on the sensor fixing plate.

Furthermore, the angle sensing mechanism includes swing bars, a connecting bar, a connecting arm and a swing arm; wherein the swing bars are two swing bars and are symmetrically arranged on both the left side and the right side of the bracket; and rear ends of the two collision plates are hingedly connected with front ends of the two swing bars respectively; and middle parts of the two swing bars are hingedly connected with both a left side and a right side of a front end of the sensor fixing plate respectively; and rear ends of the two swing bars are hingedly connected onto both a left side and a right side of the connecting bar respectively; and either one of the two swing bars is hingedly connected to one end of the connecting arm at a position near the rear end of the either one of the swing bars; and the other end of the connecting arm is hingedly connected to one end of the swing arm; and the other end of the swing arm is connected to a rotating shaft of the angle sensor.

Furthermore, two limiting bars symmetrically distributed left and right are arranged on the bracket; and the two limiting bars are located inside the two support bars.

Furthermore, a first fixing plate and a second fixing plate are arranged on a bottom surface of a grain support; and a front end and a rear end of the bracket are connected to the first fixing plate and the second fixing plate via bolts respectively.

A navigation method fusing satellite positioning, applied to a satellite positioning receiving device, a controller, and the crop row detection device according to claim 1, mounting the satellite positioning receiving device onto an upper front part of a cab of the machine tool, and mounting the crop row detection device onto a front position of a grain spreader of the machine tool;
  the method comprises the following steps:
    S01: locating a position of the machine tool in real time by the satellite positioning receiving device, and acquiring positioning coordinate information of the machine tool; analyzing and processing the positioning coordinate information by the controller, and obtaining a current position of the machine tool and a navigation line of the machine tool; and comparing them with a sowing operation trajectory, obtaining a deviation angle between a current heading of the machine tool and a planned sowing operation trajectory line;

S02: configuring a deviation angle, detected by the satellite positioning receiving device 24, between the navigation line of the machine tool and the sowing operation trajectory, as θ, and configuring a maximum angle deviation threshold allowed by the deviation angle, as $θ_e$;

configuring a position deviation threshold of the machine tool, represented by a deflection angle allowed by an angle sensor of a crop row detection device 19, as $m_e$, configuring an actual deviation distance represented by a real-time angle value of the angle sensor, as m.

S03: According to a difference between m and θ recited in Step S02, controlling the machine tool to adjust a direction by the controller.

Furthermore, in Step S03, (1) Upon $θ≤θ_e$, and $m≤m_e$, it is judged that the machine tool confirms to the configured direction both in long-distance heading and in short-distance heading, the direction of the machine tool is not adjusted, and the machine tool travels in the configured direction.

(2) Upon $θ≤θ_e$, and $m>m_e$, it is judged that the machine tool deviates from the center line between two crop rows in short-distance heading; however, the machine tool does not deviate the sowing operation trajectory in the long-distance heading; and the controller adjusts a deflection angle of the machine tool to control the machine tool to move to the center line between two crop rows, until $m≤m_e$; and the controller stops adjusting;

(3) Upon $θ>θ_e$, and $m≤m_e$, it is judged that the machine tool deviates from the sowing operation trajectory in long-distance heading; however, the machine tool does not deviate the center line between two crop rows in short-distance heading; using a signal of the satellite positioning receiving device, as a first target value; and using a signal of the crop row detection device, as a second target value; the controller adjust a deflection angle of the machine tool so that the machine tool continuously deflects towards the sowing operation trajectory, without deviating from the center line between two crop rows, detected by the crop row detection device, until a configuration requirement of $θ≤θ_e$ is satisfied; the controller stops adjusting;

(4) Upon $θ>θ_e$, and $m>m_e$, it is judged that the machine tool deviates from the sowing operation trajectory in long-distance heading; and the machine tool deviates from the center line between two crop rows in short-distance heading, either; the machine tool performs a direction adjustment for the machine tool, by only using the sowing operation trajectory as a sole target value; the controller controls the machine tool to continuously deflect towards the sowing operation trajectory, until the controller judges that a maximum angle of the navigation line of the machine tool, detected by the satellite positioning receiving device, satisfied the configuration requirement $θ≤θ_e$;

At this time, the controller begins to analyze a detection signal of the crop row detection device, and analyzes and processes the detection signal; and by comparing with $m_e$, it is judged that whether the short-distance heading deviates from the center line between queues of two crop rows; upon $m≤m_e$, the direction of the machine tool is not adjusted, and the machine tool travels in the configured direction; upon $m>m_e$, the controller adjusts the deflection angle of the machine tool to control the machine tool to move to the center line between two crop rows, until $m≤m_e$; and the controller stops adjusting.

Compared with the prior art, the beneficial effects achieved by the present disclosure are as follows:

1: The crop row detection device of the present disclosure, support bars are rotatably connected at both the left side and the right side of a front end of a bracket respectively; and the other end of each support bar is hingedly connected with linkage bars and collision plates; and the other ends of two linkage bars are rotatably connected onto the buffer mechanism respectively; and other ends of two collision plates are rotatably connected onto the angle sensing mechanism; When the collision plates collide with the crop row and deflect, the angle sensing mechanism is capable of triggering an action of an angle sensor;

The present disclosure collects plant queue information of two crop rows at the same time, and compares the crop positions by a mechanical structure, which effectively reduces the difficulty of processing sensor collection data, and at the same time avoids problems such as loss of plant location information caused by missing seedlings and row breaks and other problems in the crop rows, when only one row of plant positions is collected. The collision plate is connected to the buffer mechanism and can adjust the collision force during the collision process, thereby reducing damage to collision parts and mutation of crop plant detection signals;

2: The buffer mechanism includes a sliding base, a sliding sleeve, a screw, a motor and a linear bearing. The screw is matched with the linear bearing to adjust the relative distance of the sliding sleeve, thereby adjusting the overall buffering capacity of the buffering mechanism, making it more convenient to use and extending its range of applications;

3: The angle sensing mechanism includes swing bars, a connecting bar, a connecting arm and a swing arm. The overall structure is compact. When the swing bar moves with the collision arm, it triggers the angle sensor and obtains the angle signal;

4: The navigation method fusing satellite positioning provided by the present disclosure, includes a satellite positioning receiving device, a controller, and a crop row detection device; mounting the satellite positioning receiving device onto an upper front part of a cab of the machine tool; and mounting the crop row detection device onto a front position of a grain spreader of the machine tool; providing navigation information for long-distance heading control of a forward direction of the machine tool, by using the sowing operation trajectory information and the position information of the machine tool. The accurate position of the plant queue is obtained by the crop row detection device, thereby providing accurate navigation information for short-range heading control of a forward direction of the machine tool; and improving the accuracy of high-speed navigation by a navigation method of fusing crop row detection device and sowing operation trajectory;

The present disclosure can perform plant queue detection on two crop rows at the same time, and avoid the problem of missing detection signals from the twin rows sensing device when one crop row has problems such as seedling shortage or broken seedling, thereby improving the reliability of crop row detection and the practicality of navigation data;

5: The present disclosure can be applied to auxiliary driving operation such as auxiliary harvesting, and plant protection of crops such as cotton, and corn, and has broad application prospects.

Figure 1:
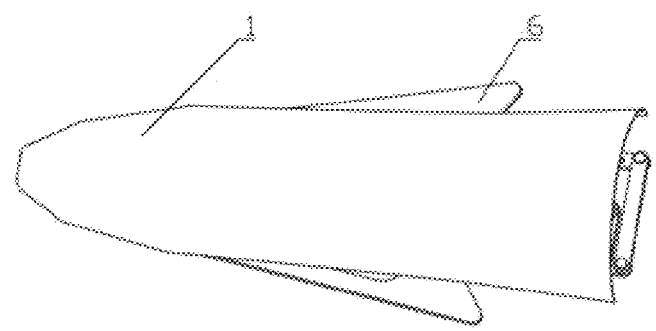
FIG. 1 is a schematic diagram for mounting the crop row detection device according to the present disclosure
Figure 2:
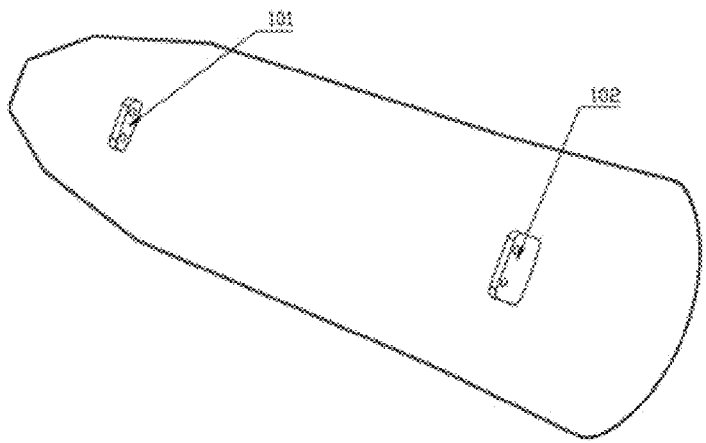
FIG. 2 is a schematic diagram of a structure of the grain support according to the present disclosure.
Figure 3:
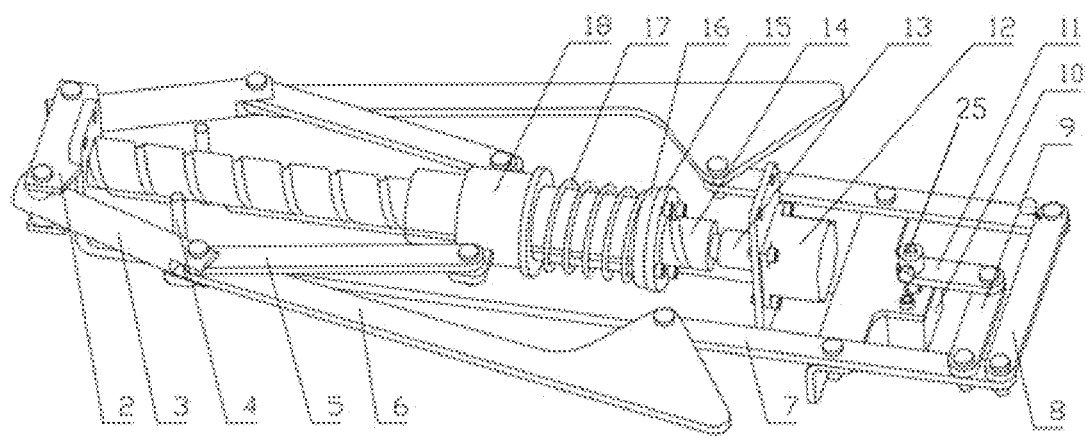
FIG. 3 is a schematic diagram of a structure of the crop row detection device according to the present disclosure.
Figure 4:
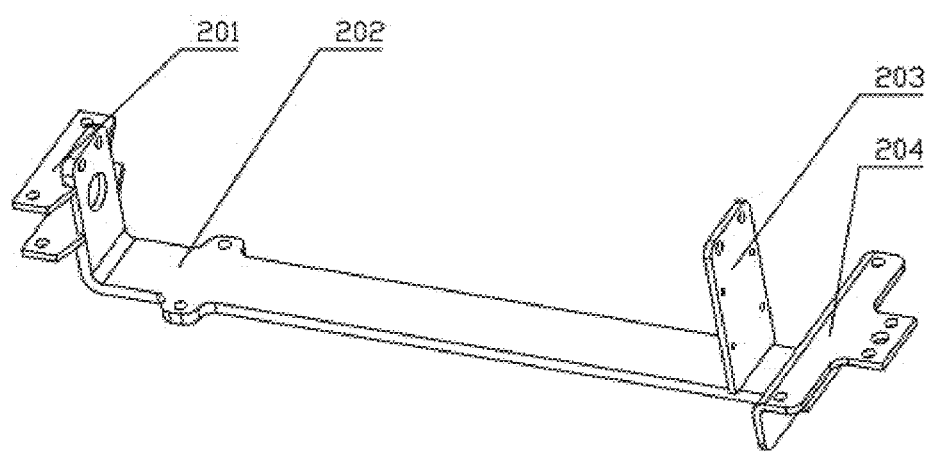
FIG. 4 is a schematic diagram of a structure of the bracket according to the present disclosure.
Figure 5:
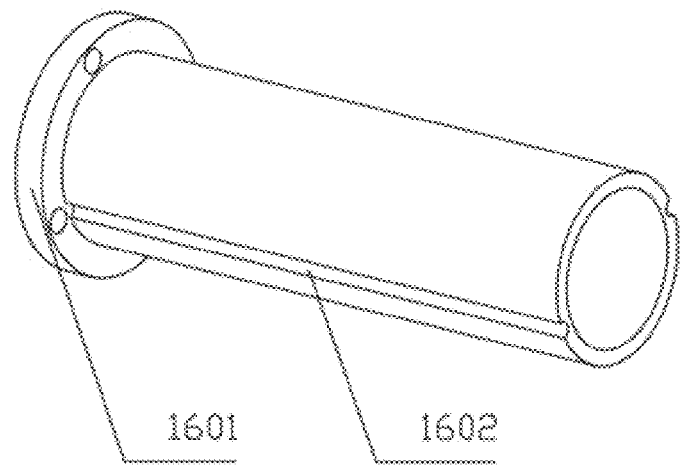
FIG. 5 is a schematic diagram of a structure of the sliding base according to the present disclosure.
Figure 6:
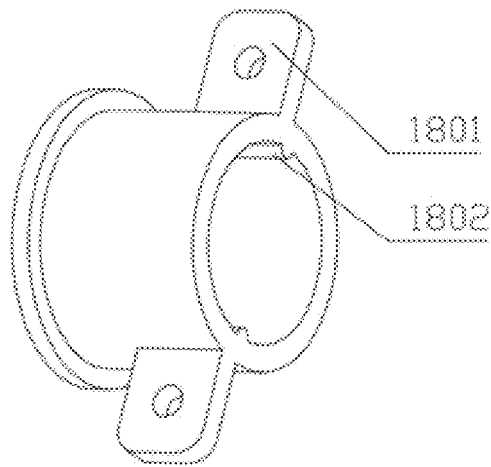
FIG. 6 is a schematic diagram of a structure of the sliding sleeve according to the present disclosure.

In the figures, 1 grain support, 2 bracket, 3 support bar, 4 limiting bar, 5 linkage bar, 6 collision plate, 7 swing bar, 8 connecting bar, 9 connecting arm, 10 angle sensor, 11 swing arm, 12 motor, 13 coupling, 14 screw, 15 linear bearing, 16 sliding base, 17 compression spring, 18 sliding sleeve, 101 first fixing plate, 102 second fixing plate, 201 support fixing plate, 202 bracket plate, 203 motor fixing plate, 204 sensor fixing plate, 1601 sliding base flange, 1602 limiting groove, 1801 fixing lug, 1802 limiting boss, 19 crop row detection device, 20 controller, 21 proportional solenoid valve, 22 steering cylinder, 23 deflection angle sensor, 24 satellite positioning receiving device.

DETAILED DESCRIPTION OF THE EMBODIMENTS

The technical solutions in the embodiments of the present disclosure will be clearly and completely described hereinafter with reference to the accompanying drawings in the embodiments of the present disclosure. Apparently, the described embodiments are only some of the embodiments of the present disclosure, not all of the embodiments. All other embodiments obtained without any creative efforts by those skilled in the art based on the embodiments of the present disclosure shall fall within the scope of protection claimed by the present disclosure.

In the description of the present disclosure, it should be understood that the orientation relationship or the positional relationship indicated by a term such as "front", "back", "upper", "lower", "left", and "right" is based on the orientation relationship or the positional relationship described in the accompanying drawings; it is only for the convenience of describing the present disclosure and simplifying the description, but do not indicate or imply that the device or element referred to must have a specific orientation or position, or must be constructed and operated in a specific orientation or position, and therefore it cannot be understood as a limitation of the present disclosure. The present disclosure will be further described below in conjunction with the accompanying drawings and embodiments.

As shown in FIGS. 1-6, the present embodiment discloses a crop row detection device, including bracket 2, a buffer mechanism and an angle sensing mechanism, the crop row detection device is overall mounted onto a bottom surface of the grain support 1. Wherein, the buffer mechanism is composed of a sliding base, a sliding sleeve, a screw, a motor and a linear bearing; and the angle sensing mechanism is composed of a swing bar, a connecting bar, a connecting arm and a swing arm.

In order to facilitate mounting the bracket 2, a first fixing plate 101 and a second fixing plate 102 are welded in a bottom of a grain support respectively. The bracket 2 is composed of a support fixing plate 201, a bracket plate 202, a motor fixing plate 203, and a sensor fixing plate 204. The bracket plate 202 is in a shape of a long strip as a whole. A front end of the bracket plate 202 is bent and has a mounting hole, and the front end of the bracket plate 202 is fixedly connected with the first fixing plate 101 of the grain support 1 by using bolts and via the mounting hole. A rear end of the bracket plate 202 is welded and connected with the motor fixing plate 203, and the sensor fixing plate 204 respectively, and the ear end of the bracket plate 202 is fixedly connected with the second fixing plate 102 by using bolts and via an upper end of the motor fixing plate 203. The support fixing plate 202 is welded to the bent end of the bracket plate 202.

There are two support bars 3. One end of the two support bars 3 is hingedly connected with the support fixing plate 201 via a shaft pin, so that the support bars 3 are symmetrically mounted on both sides of the bracket 2. The other end of the support bars 3 are hingedly connected with the linkage bar 5, and the collision plate 6, via a shaft pin. In order to prevent the support bar 3 from excessive deflection, a limiting bar 4 is fixed on both the left side and the right side of the bracket 2, the limiting bar 4 is located inside the support bar 3. The motor fixing plate 203 is fixedly connected with the motor 12 via a bolt. The motor shaft of the motor 12 is fixedly connected with one end of the screw 14 via the coupling 13. The other end of the screw 14 is spirally connected with a bent end of a front end of the bracket 2. The linear bearing 15 is threadedly connected onto the screw 14. A base flange 1601 is arranged at a rear end of the sliding base 16. The base flange 1601 is connected with the linear bearing 15 via the bolts. Limiting grooves 1602 are symmetrically designed on the outside of the sliding base 16. Limiting bosses 1802 are symmetrically designed on the inner wall of the sliding sleeve 18. The sliding sleeve 18 is mounted on the outer wall of the sliding base 16. By means of the limiting grooves 1602 and the limiting bosses 1802, the sliding sleeve 18 could freely slide along the sliding base 16 without over-rotation. Fixing lugs 1801 are arranged on both sides of the sliding sleeve 18. The other end of the linkage bar 5 is hingedly connected with the fixing lugs 1801 of the sliding sleeve 18 via a shaft pin. The compression spring 17 is mounted on the outside of the sliding base 16. One end of the compression spring 17 is contacted and connected with the sliding base 16, the other end of the compression spring 17 is contacted and connected with the sliding sleeve 18.

One ends (front ends) of two collision plates 6 are hingedly connected with rear ends of the two support bars 3 respectively. The other ends (rear ends) of the two collision plates 6 are hingedly connected with front ends of the two swing bars 7 respectively. The collision plates 6 are specialshaped plates, the shape of which includes but is not limited to the shape as recited in the present embodiment. Middle parts of the two swing bars 7 are hingedly connected with both the left end and the right end of the sensor fixing plate 204 respectively. Rear ends of the two swing bars 7 are hingedly connected with both the left end and the right end of the connecting bar 8 respectively. Either one of the two swing bars 7 is hingedly connected with one end of the connecting arm 9 at a position near the rear end of the swing bar. The other end of the connecting arm 9 is hingedly connected with one end of the swing arm 11. The other end of the swing arm 11 is fixedly connected with a rotating shaft 25 of the angle sensor 10.

When the crop row detection device of the present disclosure is mounted onto the grain support 1 of the harvester machine tool. A signal of the angle sensor 10 is connected onto the controller 20. An angle signal of the angle sensor 10 is received by the controller 20. One end of a collision plate 6 is located below the grain support 1, the other end of a collision plate 6 protrudes from the grain spreader 1, and could contact with the crop plants, and would shrink toward a bottom of the grain spreader, after being collided with the crop plants.

When implemented, the crop row detection device of the present disclosure is mainly applied to crop row detection in a process of harvesting and plant protecting crops such as corn, and cotton, and it has the following operating principles:

Before operations such as harvesting, and plant protection, instructions are transmitted to adjust a forward rotation or an inverse rotation of the motor 12 by regular remote intelligent control method such as inputting control parameters on LCD touch screen, so as to adjust an initial compression force of the compression spring 17, thereby adjusting a collision force and a buffering effect when the collision plates 6 contact with the crops. During an operating process, the crop row detection device is located in a middle position of two crop rows. In a normal operating process, two crop rows do not contact with the collision plate 6. Under an elastic force of the compression spring 17, the support bars 3, the linkage bars 5, the collision plates 6, the swing bars 7 are symmetrically distributed on both sides of the bracket 2. At this time, the angle sensor 10 is in a neutral position. When the harvester deflects, the crop row detection device deflects with the grain spreader 1. Therefore, the collision plates 6 begins to contact with crops at an either one side of the sides. Under the collision force of the crop stems, a collision plate 6 at one side of the crop row detection device moves toward a lower part of the grain support 1, thereby driving the support bar 3, and linkage bar 5 to deflect and move. One end of the linkage bar 5 compresses the compression spring 17 via the sliding sleeve 18. The collision plate 16 has a buffering effect, when the collision plate 16 collides with the crop stems. The swing bar 7 at the same side of the crop row detection device deflects, thereby driving the connecting bar 8 to move. And the swing arm 11 deflects driven by the connecting arm 9, thereby driving the rotating shaft 25 of the angle sensor 10 to rotate. An angle parameter of the angle sensor 10 is read by the controller 20, thereby obtaining a distance of the machine tool deviating from a center line between two crop rows at different angles, so as to acquire a parameter of the harvester machine tool deviating from a middle position of two crop rows. When the harvester gradually returns a middle position of the crop rows, an external force forcing the collision plates 16 to deflect gradually becomes smaller and disappears, and the compression spring 17 gradually returns to its original shape, thereby driving components such as the support bars 3, the linkage bars 5, and the collision plates 6 to gradually return to a neutral position. The controller monitors angle parameters of the angle sensor 10 in real time, thereby learning a position of two crop rows where the harvester machine tool is located.

When collision plates 6 collide with the crop plants at the same time on both sides of the crop row detection device, and when collision forces on both sides are equal to each other, components such as collisions plate 6 will not defects and moves. At this time, angle sensor 10 remain neutral. When a collision force at one side is greater than a collision force at the other side, the collision plates deflect toward a side with a smaller collision force, driving the angle sensor 10 to rotate in an opposite direction. Therefore, a deflection direction of crop rows could be determined according to a structure of the crop row detection device.

Figure 7:
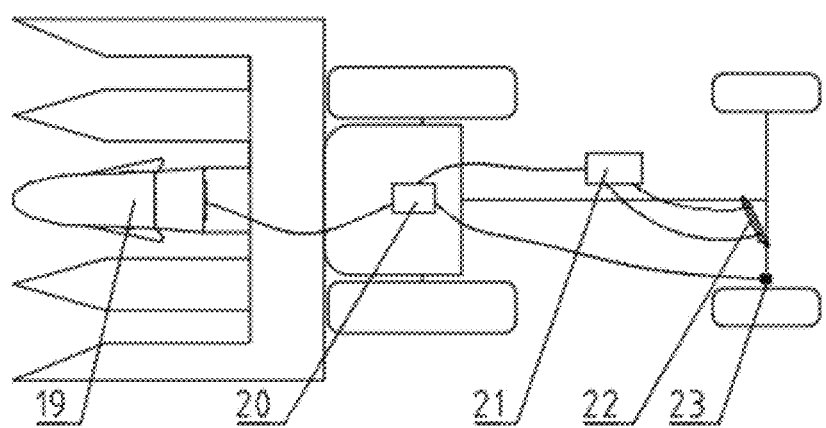
FIG. 7 is a schematic diagram for mounting the crop row detection device onto the machine tool according to the present disclosure.
Figure 8:
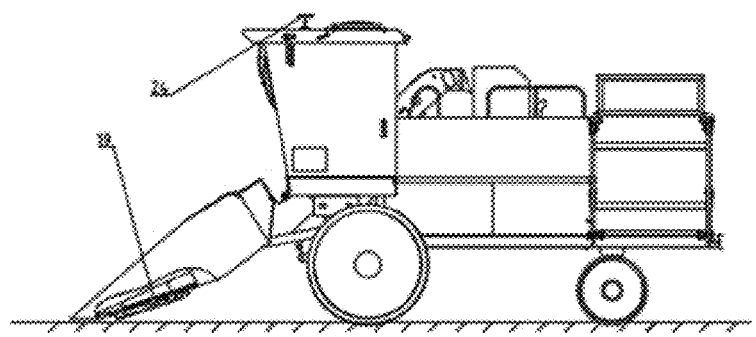
FIG. 8 is a schematic diagram for mounting the crop row detection device and the satellite positioning receiving device onto the machine tool according to the present disclosure.
Figure 9:
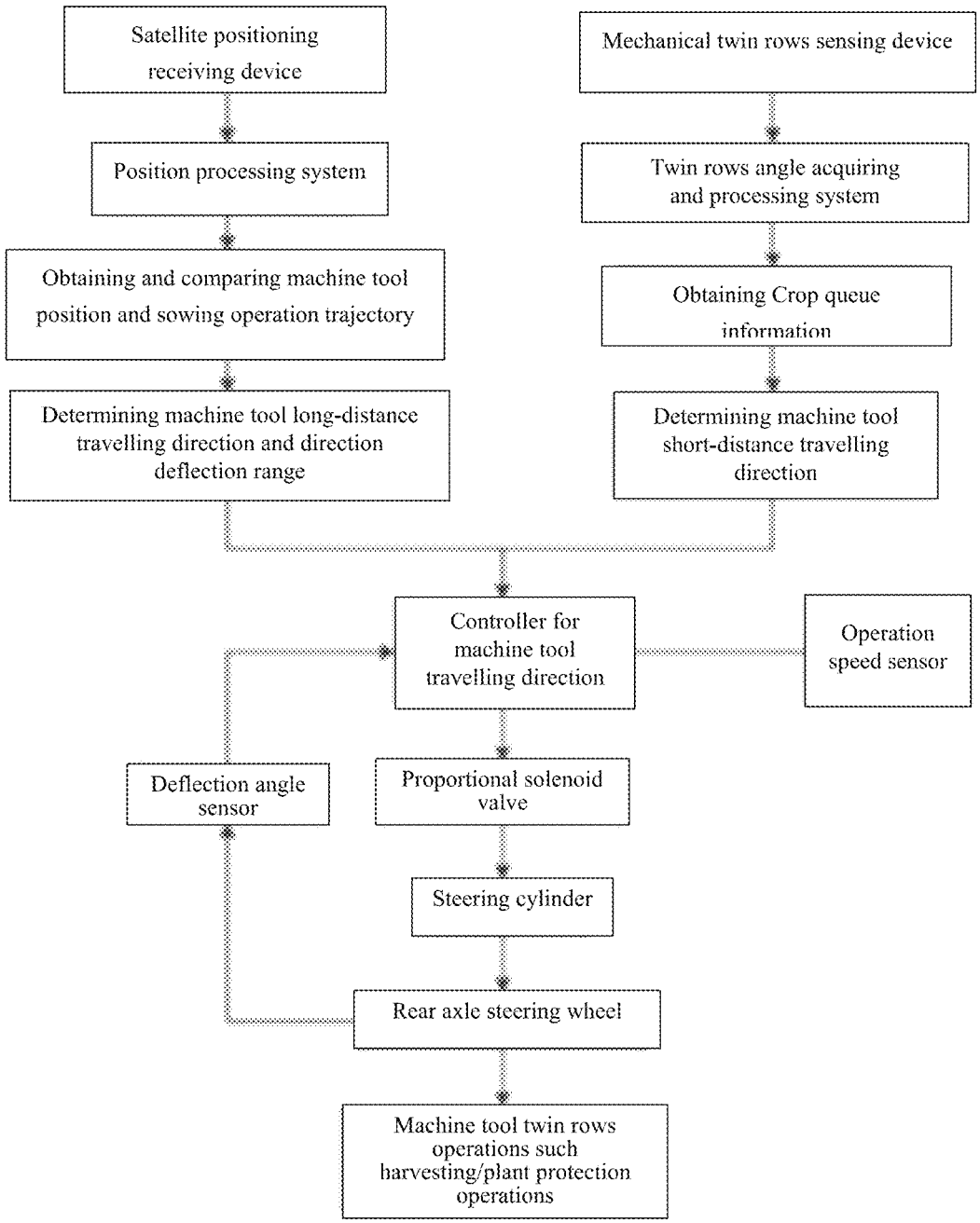
FIG. 9 is a schematic control diagram of the navigation method fusing satellite positioning according to the present disclosure.

As shown in FIGS. 7-9, the presents embodiment further provides a navigation method fusing satellite positioning, mainly applied to automatic navigation and driving operation for harvesting equipment, plant protection equipment and the like, and mainly using apparatuses such as a satellite positioning receiving device 24, a controller 20 and the crop row detection device 19 of the present disclosure; mounting the satellite positioning receiving device 24 onto an upper front part of a cab of the machine tool; mounting the crop row detection device 19 onto a front position of a grain spreader 1 of the machine tool. Previous sowing operation trajectory information at the same position recorded by the controller, is used as the planned operation trajectory line of the navigation control method of the present disclosure. Navigation information is provided, by the sowing operation trajectory and the positioning of the machine tool end, for long-distance navigation position control in the forward direction of the machine tool. An accurate position of the plant queue is obtained by the crop row detection device, providing accurate navigation information for short-distance navigation position control in the forward direction of the machine tool.

A navigation method fusing a crop row detection device and the sowing operation trajectory, improves the accuracy of high-speed navigation in twin rows harvesting and plant protection operations, the method comprises the following steps:

S01: the satellite positioning receiving device 24 transmits the current coordinate information of the machine tool to the controller 20, and the controller 20 obtains the current traveling direction of the machine tool. The controller 20 receives the operation trajectory, analyzes the operation trajectory, and extracts the machine tool of the navigation line of the current operation path; and compares it with the sowing operation trajectory at the same position stored and recorded in the controller, and obtaining a deviation angle between the current heading of the machine tool and the sowing operation trajectory;

S02: configuring a deviation angle, detected by the satellite positioning receiving device 24, between the navigation line of the machine tool and the sowing operation trajectory, as $\theta$, and configuring a maximum angle deviation threshold allowed by the deviation angle, as $\theta_e$;

configuring a position deviation threshold of the machine tool, represented by a deflection angle allowed by an angle sensor of a crop row detection device 19, as $m_e$, configuring an actual deviation distance represented by a real-time angle value of the angle sensor, as m.

S03: According to a difference between m and θ as recited in Step S02, controlling the machine tool to adjust a direction by the controller;
(1) Upon θ≤θ$_e$, and m≤m$_e$, it is judged that the machine tool is consistent with the configuration requirements, and the direction of the machine tool is not adjusted, and the machine tool travels in the configured direction.
(2) Upon θ≤θ$_e$, and m>m$_e$, it is judged that the machine tool deviates from the center line between two crop rows in short-distance heading; however, the machine tool does not deviate the sowing operation trajectory in the long-distance heading; and the controller 20 transmits instructions to control an action of the proportional solenoid valve 21 of the machine tool with a smaller amplitude and a higher frequency, so that the controller controls extension and retraction of the steering cylinder 22 of the machine tool, so as to realize a small angle correction to the travel direction of the machine tool; the controller 20 adjusts a deflection angle of the machine tool to control the machine tool to move towards the center line between two crop rows, until m≤m$_e$; and the controller stops adjusting;
During the entire steering process, the deflection angle sensor 23 of the machine tool detects the deflection angle of the steering wheel, and the operating speed sensor detects the operating speed of the machine tool, so as to ensure that driving direction of the machine tool meets the configured requirements;
(3) Upon θ>θ$_e$, and m≤m$_e$, it is judged that the machine tool deviates from the sowing operation trajectory in long-distance heading; however, the machine tool does not deviate the center line between two crop rows in short-distance heading; using a signal of the satellite positioning receiving device, as a first target value; and using a signal of the crop row detection device, as a second target value; the controller 20 transmits instructions to control actions of the proportional solenoid valve 21 and the steering cylinder 22, with a larger amplitude and a lower frequency, so that the controller adjusts a deflection angle of the machine tool, and the machine tool continuously deflects towards the sowing operation trajectory, without deviating from the center line between two crop rows, detected by the crop row detection device, until a configuration requirement of θ≤θ$_e$ is satisfied; the controller stops adjusting;
(4) Upon θ>θ$_e$, and m>m$_e$, it is judged that the machine tool deviates from the sowing operation trajectory in long-distance heading; and the machine tool deviates from the center line between two crop rows in short-distance heading, either; the machine tool performs a direction adjustment for the machine tool, by only using the sowing operation trajectory as a sole target value; the controller 20 transmits instructions to control actions of the proportional solenoid valve 21 and the steering cylinder 22, with a larger amplitude and a lower frequency, so that the controller controls the machine tool to continuously deflect towards the sowing operation trajectory, until the controller judges that a maximum angle of the navigation line of the machine tool, detected by the satellite positioning receiving device, satisfied the configuration requirement θ≤θ$_e$;

At this time, the controller begins to analyze a detection signal of the crop row detection device, and analyzes and processes the detection signal; and by comparing with m$_e$, it is judged that whether the short-distance heading deviates from the center line between queues of two crop rows; upon m≤m$_e$, the direction of the machine tool is not adjusted, and the machine tool travels in the configured direction; upon m>m$_e$, the controller adjusts the deflection angle of the machine tool to control the machine tool to move to the center line between two crop rows, until m≤m$_e$; and the controller stops adjusting.

What is claimed is:

1. A crop row detection device, comprising a bracket, a buffer mechanism and an angle sensing mechanism;
   a left side and a right side of a front end of the bracket are rotatably connected with one end of a respective support bar of two support bars; and an other end of each support bar is hingedly connected with one end of a respective linkage bar of two linkage bars and one end of a respective collision plate of two collision plates;
   the buffer mechanism is arranged on the bracket; and other ends of two linkage bars are rotatably connected onto the buffer mechanism respectively;
   the angle sensing mechanism is arranged onto a rear end of the bracket; and other ends of two collision plates are rotatably connected onto the angle sensing mechanism; and upon the collision plates colliding crop rows and deflecting, the angle sensing mechanism triggers an action of an angle sensor;
   the buffer mechanism comprises a sliding base and a sliding sleeve; and the sliding sleeve is slidingly connected to an outer side of the sliding base; and a compression spring is arranged at an outer wall of the sliding base; and one end of the compression spring is connected with the sliding base, an other end of the compression spring is connected with the sliding sleeve;
   the other ends of the two linkage bars are rotatably connected with both the left side and the right side of the sliding sleeve respectively;
   the buffer mechanism further comprises a screw, a motor and a linear bearing; a motor fixing plate is arranged on the bracket; and a support fixing plate is at a front end of the bracket; and front ends of two support bars are symmetrically hinged onto the left side and the right side of the support fixing plate; and one end of the screw is spirally mounted on a front end of the bracket; the motor is mounted onto the motor fixing plate; and an output shaft of the motor is connected to an other end of the screw;
   the linear bearing is threadedly connected onto the screw; and the sliding base is slidingly connected onto the screw; and a base flange is arranged at a rear end of the sliding base; and the base flange is connected with the linear bearing.

2. The crop row detection device according to claim 1, wherein, a sensor fixing plate is arranged at a rear end of the bracket; and the angle sensor is mounted on the sensor fixing plate.

3. The crop row detection device according to claim 2, wherein, the angle sensing mechanism comprises swing bars, a connecting bar, a connecting arm and a swing arm; wherein the swing bars are two swing bars and are symmetrically arranged on both the left side and the right side of the bracket; and rear ends of the two collision plates are hingedly connected with front ends of the two swing bars respectively; and middle parts of the two swing bars are hingedly connected with both a left side and a right side of a front end of the sensor fixing plate respectively; and rear ends of the two swing bars are hingedly connected onto both a left side and a right side of the connecting bar respectively; and either one of the two swing bars is hingedly connected to one end of the connecting arm at a position near the rear end of the either one of the swing bars; and an other end of the connecting arm is hingedly connected to one end of the swing arm; and an other end of the swing arm is connected to a rotating shaft of the angle sensor.

4. The crop row detection device according to claim 1, wherein, two limiting bars symmetrically distributed left and right are arranged on the bracket; and the two limiting bars are located inside the two support bars.

5. The crop row detection device according to claim 1, wherein, a first fixing plate and a second fixing plate are arranged on a bottom surface of a grain support; and a front end and a rear end of the bracket are connected to the first fixing plate and the second fixing plate via bolts respectively.

* * * * *